(12) United States Patent
Uchiyama

(10) Patent No.: US 6,417,451 B1
(45) Date of Patent: Jul. 9, 2002

(54) MOUNTING STRUCTURE IN COMBINATION WITH A TUBE FOR MOUNTING A WIRE HARNESS, A WIRE HARNESS, AND A METHOD OF MAKING A WIRE HARNESS

(75) Inventor: Kenichi Uchiyama, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/670,545

(22) Filed: Sep. 27, 2000

(30) Foreign Application Priority Data

Sep. 29, 1999 (JP) .......................... 11-277443

(51) Int. Cl.$^7$ ................................. H02G 3/00
(52) U.S. Cl. .................. 174/72 A; 174/DIG. 8; 191/23 R; 248/73
(58) Field of Search .................. 174/72 A, DIG. 8, 174/70 C, 70 R, 72 C, 135, 136; 248/65, 73; 191/23 R; 296/146.9; 439/34

(56) References Cited

U.S. PATENT DOCUMENTS

| | | | | |
|---|---|---|---|---|
| 3,743,748 A | * | 7/1973 | Reeder .................. 174/DIG. 8 |
| 4,163,117 A | * | 7/1979 | Campbell et al. ...... 174/DIG. 8 |
| 4,237,174 A | * | 12/1980 | Lagardere et al. ..... 174/DIG. 8 |
| 4,525,904 A | * | 7/1985 | Petri ........................... 248/73 |
| 4,822,956 A | * | 4/1989 | Sepe ........................ 174/72 A |
| 4,871,134 A | * | 10/1989 | Oikawa ........................ 248/65 |
| 4,918,261 A | * | 4/1990 | Takahashi et al. ......... 174/135 |
| 4,953,801 A | * | 9/1990 | Oikawa ........................ 248/65 |
| 5,012,995 A | * | 5/1991 | Ward et al. .................... 248/73 |
| 5,106,040 A | * | 4/1992 | Cafmeyer et al. ............. 248/73 |
| 5,367,126 A | * | 11/1994 | Kikuchi .................... 174/71 R |
| 5,720,586 A | * | 2/1998 | Kawaguchi ................... 248/73 |
| 5,796,045 A | * | 8/1998 | Lancien et al. ........ 174/DIG. 8 |
| 5,911,450 A | * | 6/1999 | Shibata et al. ............ 174/72 A |
| 5,957,702 A | | 9/1999 | Nagai et al. |
| 6,018,874 A | * | 2/2000 | Todd ........................... 174/136 |
| 6,042,062 A | * | 3/2000 | Sugiyama .................... 248/65 |
| 6,176,873 B1 | * | 1/2001 | Ouchi ....................... 623/1.22 |

* cited by examiner

Primary Examiner—Dean A. Reichard
Assistant Examiner—Adolfo Nino
(74) Attorney, Agent, or Firm—Greenblum & Bernstein, P.L.C.

(57) ABSTRACT

A wire harness is provided that is bent in a. housing fixed on an automobile, the housing having an insertion aperture and a pull-out aperture. The wire harness is pulled into the inside of the housing by providing an elastic member between the housing and the wire harness. A portion of the wire harness pulled out from the pull-out aperture is engaged with a door. The wire harness is pulled out in accordance with a door opening operation and is retracted into the inside of the housing in accordance with a door closing operation. The wire harness includes a mesh tube, an electric wire or optical fiber inserted into the mesh tube, and an attachment member having a strip portion. The wire harness further includes a heat shrinkable tube that surrounds the strip portion and the mesh tube.

28 Claims, 3 Drawing Sheets

MOUNTING STRUCTURE IN COMBINATION WITH A TUBE FOR MOUNTING A WIRE HARNESS, A WIRE HARNESS, AND A METHOD OF MAKING A WIRE HARNESS

BACKGROUND OF THE INVENTION

1. Field of Invention

The present invention relates to a mounting structure in combination with a tube for mounting a wire harness, and the wire harness. The wire harness is preferable mounted to an automobile. In particular, in a movable wire harness mounted to extend from an automobile body side to a door side and that is extensibly/retractably movable during opening and closing of the door, the present invention relates to an improvement of an exterior member and an engaging mechanism of the wire harness. Further, the present invention relates to a method for making the wire harness.

2. Description of Related Art

As shown in FIGS. 5(A) and 5(B), a wire harness W/H mounted to extend from an automobile body 1 to a back door 2 is fixed at the automobile body 1 side. The back door 2 moves up and down during an opening and closing operation of the back door. The wire harness W/H should be pulled out toward the back door 2 side, when the back door is opened. Meanwhile, when the back door 2 is closed, the wire harness W/H should be retracted toward the automobile body 1 side. Accordingly, a housing 3 is provided at the automobile body side for extending and retracting the wire harness. The wire harness W/H has sufficient slack to be bent or meandered and stored in the housing 3, and is fixed at the automobile body I side and the back door 2 side by clips 5 and 4, respectively. Further, a spring 6 is mounted between the wire harness W/H and the housing 3 so that the wire harness W/H is forced to be retracted into the housing 3.

According to the structure described above, the wire harness W/H is pulled out from the housing 3 against the force of the spring 6, when the back door 2 is opened. Moreover, when the back door 2 is closed, the wire harness is retracted into the housing 3 by the spring 6.

Since the above-described wire harness W/H is mounted between the automobile body 1 and the back door 2, a portion of the wire harness W/H that is pulled out from the housing 3 and is attached to the back door 2 is exposed to a passenger compartment side. A conventional wire harness W/H is made of electric wires wrapped with tape T1. However, the tape T1 may be broken by interference of objects, and thus, the wire harness is not sufficiently protected. In addition, the appearance is not good.

Further, during an extending or retracting operation of the wire harness, tensile loads are intensively applied to the clip 4, which fixes the wire harness W/H on the back door 2, and to the clip 7, which fixes the spring 6 to the wire harness W/H. Accordingly, the wire harness can be easily separated from the clips 4 and 7. In other words, when the clips 4 and 7 are band-type clips as shown in FIG. 6(A), the wire harness might escape from the band. When the clips 4 and 7 are strip-type clips, as shown in FIG. 6(B), and the wire harness is fixed to the strip of the clips by wrapping tape T2, the tape T2 might be torn off. When the wire harness W/H is separated from the clip 4, which fixes the wire harness W/H to the back door 2, the wire harness W/H hangs down toward the passenger compartment side and does not smoothly follow the opening and closing operation. Further, when the wire harness is separated from the clip 7 that fixes the wire harness W/H to the spring 6, the spring force is not applied to the wire harness, and thus, an extending and retracting operation of the wire harness may not be performed.

The present invention is provided to eliminate the above-described drawbacks, i.e., to improve protection and appearance of the wire harness, and further, to securely fix the wire harness to the back door side and to the spring even during extending and retracting operation of the wire harness.

SUMMARY OF THE INVENTION

To achieve the above and/or other goals, the present invention provides, in combination with a tubular member, a mounting structure for the tubular member. The combination includes an attachment member having a strip portion mounted on an outer peripheral surface of the tubular member, and a heat shrinkable tube surrounding a part of the strip portion of the attachment member and the tubular member. The heat shrinkable tube is contracted by heating. Thus, heating causes the heat shrinkable tube to contract so that the strip portion is fixed to the tubular member.

Preferably, the tubular member is a mesh tube. The mesh tube provides better appearance. The tubular member preferably is non-extensible, and the diameter of the tubular member can be enlarged when the tubular member is axially compressed.

Further, preferably, a hot-melt adhesive is provided on an inner peripheral surface of the heat shrinkable tube. When the hot-melt adhesive is used in combination with the mesh tube, heating causes the hot-melt adhesive to melt and permeate into a mesh of the mesh tube and causes the heat shrinkable tube to contract, so that the strip portion is tightly fixed to the mesh tube.

An elongated member can be inserted into the tubular member, to form a wire harness, for example. The elongated member can be at least one of an electric wire and an optical fiber.

The tubular member is suitable to be mounted for movement, in particular, the tubular member is mounted between an automobile body and a door attached to the automobile body.

The attachment member can be a clip to engage the tubular member with stable points, however, the attachment member can have any desired configuration, for example, a connector that connects two tubular members in parallel.

In the combination, the heat shrinkable tube may be a pair of short length tubes provided at opposite ends of the strip portion in a longitudinal direction. Alternatively, the heat shrinkable tube may have a length substantially the same as a length of the strip portion and a hole is provided in a peripheral surface of the heat shrinkable tube, so that the engaging portion projects through the hole toward the exterior.

In another aspect of the present invention, a wire harness including at least one of an electric wire and an optical fiber is provided. The wire harness further includes a tubular member into which the at least one of the electric wire and the optical fiber is inserted, and at least one attachment member having a strip portion mounted on an outer peripheral surface of the tubular member. A heat shrinkable tube surrounds the strip portion of the attachment member and the tubular member, and heating contracts the heat shrinkable tube. Thus, heating causes the heat shrinkable tube to contract so that the strip portion is fixed to the tubular member.

Preferably, the tubular member is a mesh tube. The mesh tube can be made of suitable insulating resin strands, such as nylon or PET, knitted or woven in a cylindrical shape. The tubular member is not extensible, and the diameter of the mesh tube and the mesh size is enlarged when the mesh tube is compressed in an axial direction to enable insertion of the at least one of an electric wire and an optical fiber.

When a set of electric wires and/or optical fibers of a wire harness is inserted into the mesh tube, superior protective function can be achieved as compared with tape wrapping, and appearance of the wire harness exposed to, for example, the inside of the passenger compartment can be improved. In addition, since the diameter of the mesh tube is enlarged when the mesh tube is compressed in the axial direction, the electric wires and/or optical fibers can be easily inserted into the mesh tube.

Preferably, hot-melt adhesive is provided on an inner peripheral surface of the heat shrinkable tube. When the hot-melt adhesive is used with a mesh tube, heating causes the hot-melt adhesive to melt and permeate into the mesh of the mesh tube to provide plural anchor points. Accordingly, the strip portion is fixed to the mesh tube more tightly.

The attachment member can be a clip.

The wire harness of the present invention may be used between any movable and stationary surfaces, but is particularly suitable to be mounted for movement. For example, the wire harness can be provided between an automobile body and a door attached to the automobile body. The door may be a back door that is opened and closed in a vertical direction. Further, a portion of the wire harness is stored in a housing provided on the automobile body when the door is closed and is pulled out from the housing when the door is opened. In this case, a pair of clips are provided on the tubular member. Each has an engaging portion projecting from a strip portion. One of the pair of the clips engages with an elastic member provided between the tubular member and the housing so that the tubular member is retracted inside of the housing. The other clip engages with the door.

A coil spring is preferably used as the elastic member. A hook provided at one end of the coil spring is hooked in a hole provided in the engaging portion of the clip. The clip, fixed to the mesh tube by a heat shrinkable tube on which the hot-melt adhesive is applied, is used to fix the wire harness to the door. However, the clip may also preferably be used to fix the wire harness to the elastic member (spring).

When an attachment member (a band-type or a strip-type clip) is fixed to the outer peripheral surface of the mesh tube by a conventional method, since the mesh tube has a low friction drag, i.e., is easy to slip, the same problem occurring in the conventional wire harness wrapped with tape still occurs. In other words, when a band-type clip is used, the band may slide along or slide off the mesh tube. When a strip-type clip is used, the tape wrapping the clip and the wire harness may be torn off. Accordingly, in the present invention, a heat shrinkable tube, preferably with hot-melt adhesive, is used to surround a strip portion of the strip-type clip and the mesh tube. When heat is applied to the heat shrinkable tube, the hot-melt adhesive melts and permeates into the mesh of the mesh tube, and the heat shrinkable tube contracts to be fixed to the strip portion and the mesh tube. Thus, the strip-type clip is firmly fixed to the mesh tube.

The heat shrinkable tube may be a pair of short length tubes provided at opposite ends of the strip portion in a longitudinal direction. Alternatively, the heat shrinkable tube may have a length substantially the same as a length of the strip portion and a hole is provided in a peripheral surface of the heat shrinkable tube, so that the engaging portion projects through the hole toward the exterior.

Thus, when the strip portion of the strip-type clip is fixed to the mesh tube by the hot-melt adhesive melting and permeating into the mesh of the mesh tube, and the strip portion is tightly pressed to the outer peripheral surface of the mesh tube by contraction of the heat shrinkable tube, even if a pulling-off force is applied to the mesh tube into which electric wires are inserted, the clip can be prevented from separating from the mesh tube.

In another aspect of the present invention, a method for making a wire harness is provided. In the method, at least one of an electric wire and an optical fiber is inserted into a mesh tube. A clip is mounted on the mesh tube. A heat shrinkable tube surrounds the mesh tube and the clip. Then, the heat shrinkable tube is heated to contract the heat shrinkable tube so that the clip is fixed on the mesh tube.

The method further can include providing a hot-melt adhesive on an inner peripheral surface of the heat shrinkable tube, and heating the hot-melt adhesive to melt and permeate the hot-melt adhesive into the mesh tube.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 5A:
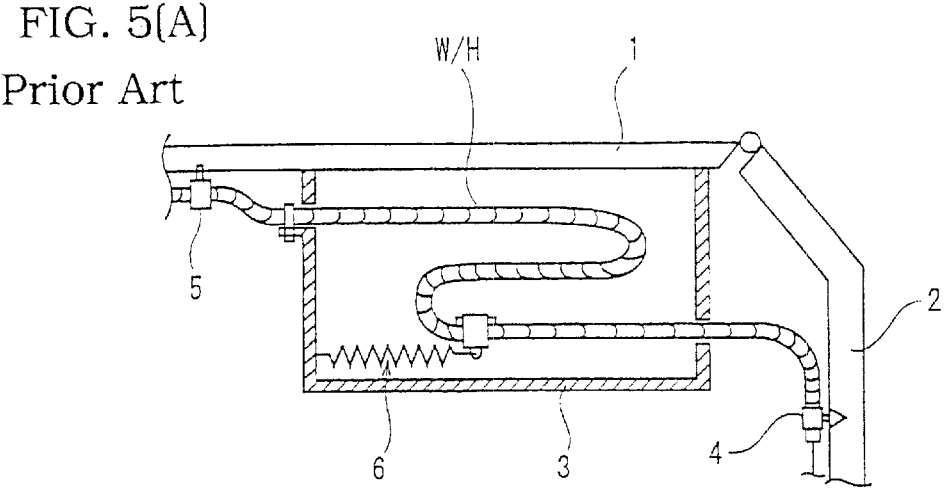
FIGS. 5(A) and 5(B) are schematic cross-sectional views illustrating a conventional wire harness mounted between an automobile body and a back door.
Figure 5B:
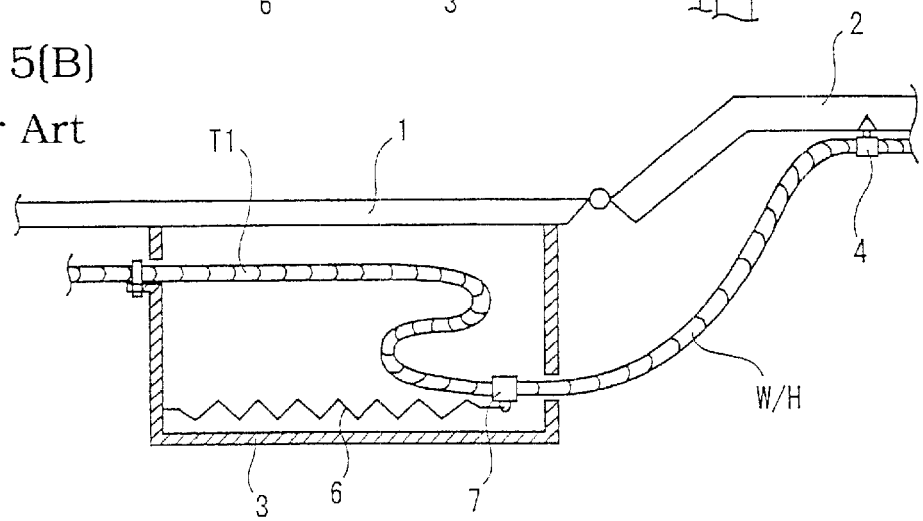
Figure 6A:
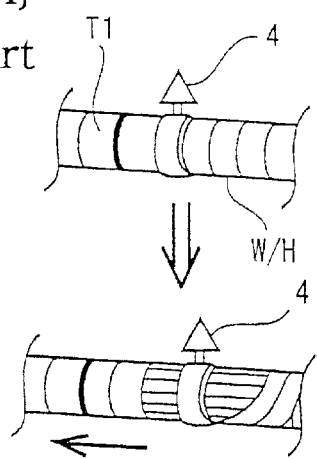
FIGS. 6(A) and 6(B) are enlarged views of the conventional wire harness depicting the drawbacks thereof.
Figure 6B:
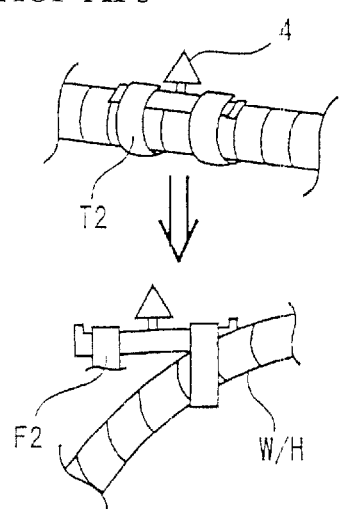

In the following, embodiments of the present invention are described with reference to figures. The embodiments are directed to a wire harness W/H that is mounted between an automobile body 1 and a back door 2 in the same way as the conventional wire harness as shown in FIGS. 5(A) and 5(B). In the embodiments described below, the term "wire harness" encompasses a harness having electrical wires, or optical fibers, or a combination of electrical wires and optical fibers. Of course, the wire harness may include any suitable elongated conductor known to those skilled in the art.

A rectangular-frame housing 10 made of resin is mounted to a portion of the automobile body 1 close to the back door 2 so that the wire harness may be extended therefrom and retracted therein. A wire harness insertion aperture 10b is provided in the side wall 10a of the housing 10 at the automobile body interior side, and a wire harness pull-out aperture 10d is provided in the side wall 10c of the housing 10 at the door side.

Figure 1A:
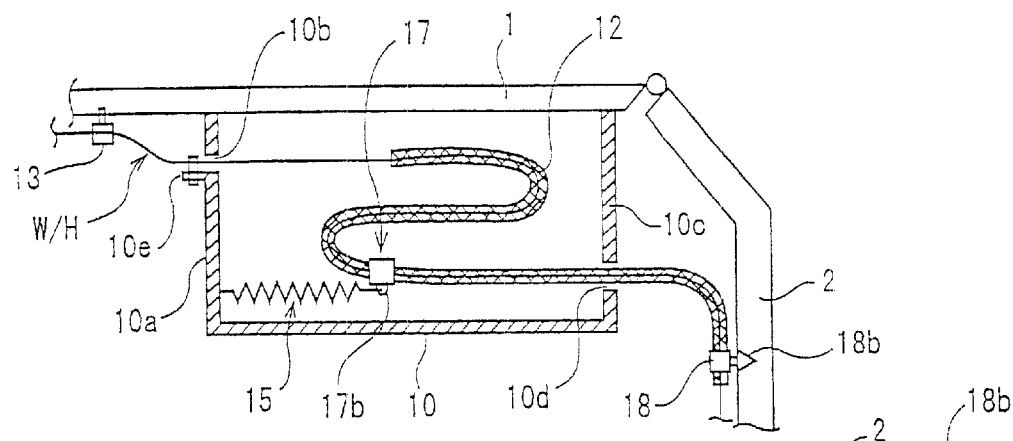
FIGS. 1(A) and 1(B) are schematic cross-sectional views illustrating a wire harness provided between an automobile body and a back door, according to a first embodiment of the present invention.
Figure 1B:
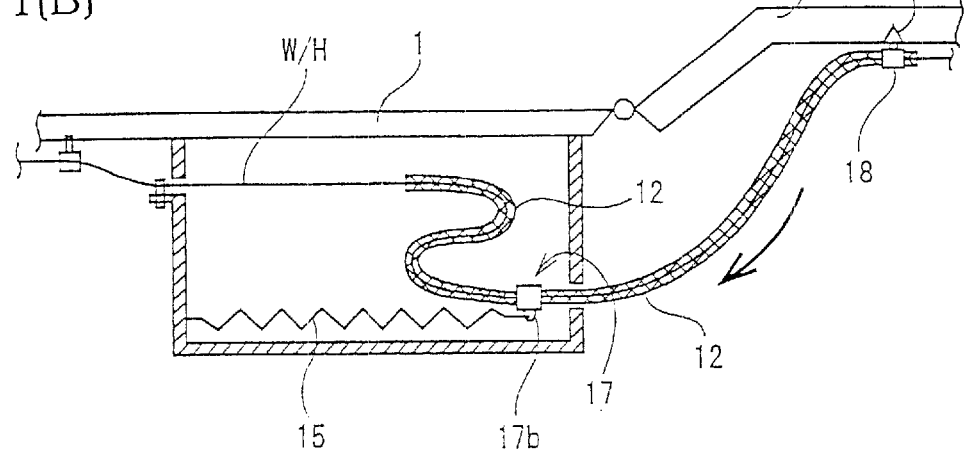

The wire harness extends from the interior side of the automobile body to the back door 2 side through the inside of the housing 10. A portion of electric wires of the wire harness W/H that is exposed to the exterior when the back door is opened is inserted into a mesh tube 12. An optical fiber can be inserted with the electric wires in the mesh tube 12. Thus, as shown in FIGS. 1(A) and 1(B), at least in the portion of the wire harness W/H between the position to be clipped to the back door 2 and the position to be pulled out and exposed exterior when the back door 2 is opened (though to be stored when the back door is closed), a set of electric wires W is inserted into the mesh tube 12. Note that, in the following explanation, a set of electric wires W means electric wires and/or optical fibers.

The mesh tube 12 is made of strong insulating resin strands formed to have a small-diameter cylindrical shape, for example by circular-knitting. The mesh tube 12 is not extensible, but, when it is compressed in an axial direction of the cylindrical shape, the diameter of the mesh tube becomes enlarged (in a manner of a Chinese finger trap) and the mesh size can be extended (flared) to enable insertion of the electric wires and/or optical fibers easily. The mesh tube provides a better appearance than the set of electric wires and/or optical fibers wrapped with tape of the conventional wire harness, and also provides a superior protective function. Accordingly, as described above, a portion of the set of electric wires W that is exposed to the exterior when the back door 2 is opened is inserted into the mesh tube 12.

The above-described wire harness W/H is fixed to the automobile body 1 by using a clip 13, and is also fixed to a taping tongue 10e projecting from the insertion aperture 10b of the housing 10, by wrapping tape. Then, the wire harness W/H is inserted into the housing 10 and is bent in a U-shape or meandered inside the housing 10. The wire harness W/H may be pulled out from the housing 10 through the pull-out aperture 10d to extend to the back door 2 side.

Figure 2A:
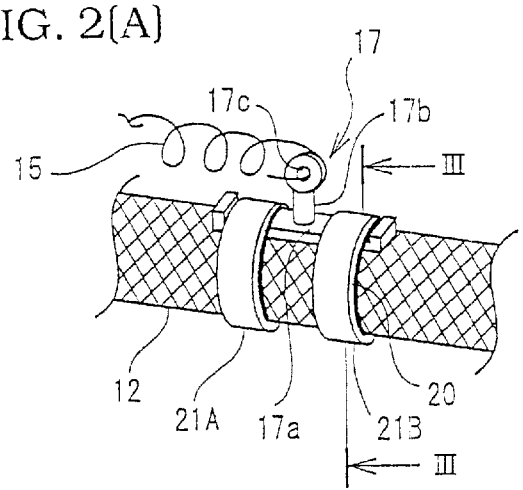
FIGS. 2(A) and 2(B) are enlarged views illustrating main portions of the wire harness according to the first embodiment of the present invention.
Figure 2B:
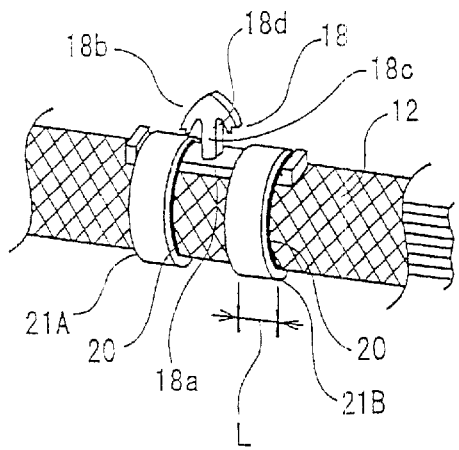
Figure 3:
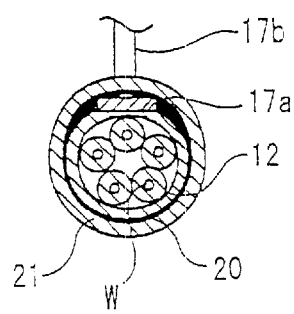
FIG. 3 is a cross-sectional view of the wire harness shown in FIG. 2(A) taken along the line III–III of FIG. 2(A)

In the housing 10, a coil spring 15 is provided between the inner surface of the side wall 10a and the mesh tube 12 in which the electric wires W are inserted, so that the wire harness is forced to be pulled into the inside of the housing 10. One end of the coil spring 15 has a hook-shape, and, as shown in FIG. 2(A), is engaged with the strip-type clip 17 fixed to the mesh tube 12. In addition, the mesh tube 12 that is pulled out through the pull-out aperture 10d of the housing 10, is engaged with the back door 2 by using a strip-type clip 18 fixed to the mesh tube 12, as shown in FIG. 2(B).

The strip-type clip 17 to be engaged with the spring and the strip-type clip 18 to be engaged with a back door have an identical structure to be fixed on the mesh tube 12, but have different engaging portions. The strip-type clip 17 to be engaged with the spring has a flat-shape engaging portion 17b projecting from the center of the strip portion 17a, and an engaging hole is provided in the flat-shape engaging portion 17b. The strip-type clip 18 to be engaged with a back door has an engaging portion 18b including a stem portion 18c projecting from the center of the strip portion 18a and engaging wings 18d that project from the tip of the stem portion 18c and extend downwardly. The engaging wings 18d are inserted into an attachment hole 2a provided in the back door 2 to be engaged therewith.

The strip portions 17a and 18a of the strip-type clips 17 and 18 are mounted on the outer peripheral surface of the mesh tube 12 and both ends in a longitudinal direction of each of the strip portions 17a and 18a and the mesh tube 12 are surrounded by a respective heat shrinkable tube 21A, 21B having an inner peripheral surface on WHICH a hot-melt adhesive 20 is applied. If a mesh tube having ¼-inch diameter is used, for example, SUMITUBE W3C-⅜ (a product manufactured by Sumitomo Electric Industries, Ltd.), which has ⅜ inch diameter, is preferably used as the heat shrinkable tubes 21A and 21B. This product is irradiated cross-linked, thermally-stabilized, flexible heat-shrinkable tubing with a hotmelt adhesive inner liner. The material of the SUMITUBE is an electron irradiated cross-linked polyolefin resin, and the inner adhesive liner is made from thermoplastic hotmelts adhesives. The thickness of the SUMITUBE W3C-⅜ is about five times the thickness of polyvinyl chloride tape, which is conventionally used to fix the strip portion to the wire harness. Thus, the heat shrinkable tubes 21A and 21B have a strength much greater than that of the tape. The heat shrinkable tubes 21A and 21B to be provided at both ends of the strip portion are short length tubes. Thus, the length L of each of the heat shrinkable tubes 21A and 21B is much shorter than the length of the strip portion. For example, when the length of the strip is about 75 mm, the length of the heat shrinkable tube is about 20 mm in this embodiment.

When the heat shrinkable tubes 21A and 21B are provided at the opposite ends of each of the strip portions 17a and 18a and are heated up to a predetermined temperature, the hot-melt adhesive 20 melts and permeates into the mesh of the mesh tube 12. Further, the heat shrinkable tubes 21A and 21B contract to tightly secure to both ends of each of the strip portions 17a and 18a and to the outer peripheral surface of the mesh tube 12.

As described above, the strip-type clip 18 to be engaged with the back door 2 and the strip-type clip 17 to be engaged with one end of the coil spring 15 are fixed to the mesh tube 12 of the wire harness W/H, which includes electric wires inserted into the mesh tube 12, by using hot-melt adhesive 20. Since the hot-melt adhesive 20 melts and permeates into the mesh of the mesh tube 12, a plurality of anchor points are formed with the mesh. Further, the heat shrinkable tubes 21A and 21B are also heat-contracted to be firmly secured to the strip portions and the mesh tube 12 by shrinking. Note that the inner adhesive liner of the SUMITUBE does not adhesively bond to either the mesh tube or to the strip portions of the clips. However, even though no adhesive bond is provided, the hot-melt adhesive forming the anchor points fixedly secures the heat shrinkable tubes, and thus the clip, relative to mesh tube. Furthermore, the heat shrinkable tubes 21A and 21B are thicker than tapes conventionally used, and thus provide a superior strength. Thus, by using the heat shrinkable tubes with hot-melt adhesive to fix the clips onto the mesh tube, strong fixation can be achieved. As a result, during an opening and closing operation of the door, even if a force is intensively applied to the portions where the clips 17 and 18 are attached, the clips 17 and 18 are prevented from separating from the mesh of the mesh tube 12, or from being torn off and separated from the mesh tube 12.

Thus, since the wire harness is firmly engaged with the back door 2 and the coil spring 15, the wire harness can securely follow an opening and closing operation of the back door. Further, even if the wire harness is exposed to the exterior during the opening and closing operation, since the electric wires are sheathed within the mesh tube 12, the appearance and protective function of the wire harness are improved.

The wire harness of the present embodiment is manufactured in the following way. The electric wires and/or optical fibers are provided for insertion into a mesh tube. At this time, the mesh tube is axially compressed to insert the electric wires and/or optical fibers, as described above. Then, the clip is mounted on the mesh tube. A pair of the heat shrinkable tubes with hot-melt adhesive on the inner peripheral surface are provided so as to surround the mesh tube and each end of the clip. Then, the heat shrinkable tubes are heated. By heating, the heat shrinkable tube contracts and the hot-melt adhesive melts and permeates into the mesh of the mesh tube so that the clip is fixed on the mesh tube.

In the above embodiment, a heat shrinkable tube with hot-melt adhesive is used to make the process simpler. However, hot-melt adhesive can be applied separately from the heat shrinkable tube. In other words, it is possible to apply hot-melt adhesive on the inner peripheral surface of the heat shrinkable tube or on the mesh tube where the heat shrinkable tube is intended to be provided.

Figure 4:
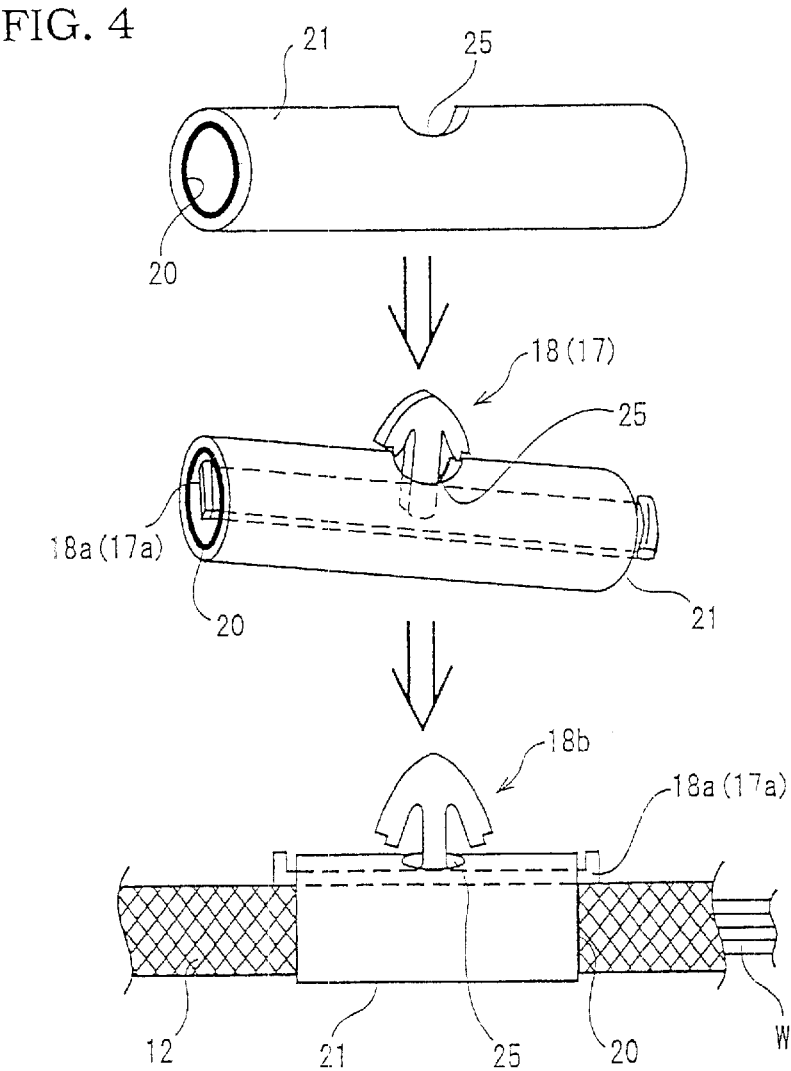
FIG. 4 shows a wire harness according to a second embodiment of the present invention.

FIG. 4 shows a second embodiment of the present invention. In this embodiment, the length of a heat shrinkable tube 21 is about the same length as the length of the strip portions 17a and 18a of the strip-type clip 17 and 18, and a hole 25 is provided at about the center of its length. The engaging portions 17b and 18b, which project from the center of the strip portions 17a and 18a, project through the hole 25 toward the exterior.

When this type of the heat shrinkable tube is used, as shown in FIG. 4, initially, the clip 17 or 18 is inserted into the heat shrinkable tube 21 and the engaging portion 17b or 18b projects through the hole 25 toward exterior. In this condition, a set of the electric wires W within the mesh tube 12 is inserted into the heat shrinkable tube 21. Thus, the mesh tube 12 is engaged with the strip portion 17a of the clip 17 and the heat shrinkable tube 21, or with the strip portion 18a of the clip 18 and the heat shrinkable tube 21. Then, the heat shrinkable tubes 21 are heated in the same way as the first embodiment. By applying heat, the hot-melt adhesive 20 melts and permeates into the mesh and the heat shrinkable tube 21 contracts so as to be firmly fixed to the strip portions 17a and 18a and the mesh tube 12.

Note that, in the embodiments described above, the invention is applied to the wire harness mounted between an automobile body and a back door. However, the invention is not restricted to the back door, rather it is possible to be applied to wire harnesses that are mounted between the automobile body and any door, or similar member, which is opened and closed with respect to the automobile body.

As clearly described above, according to the present invention, a wire harness that is mounted between an automobile body and a door, such as a back door, and is exposed to the exterior during an opening and closing operation of the door, is inserted into a mesh tube having superior strength. Accordingly, a protective function of the electric wires can be improved as well as the appearance of the wire harness compared with the conventional tape wrapping.

Further, a strip-type clip is used at the position where a mesh tube engages with a door or an elastic member, such as a spring, and is fixed to the mesh tube by using a hot-melt adhesive in combination with a heat shrinkable tube. Accordingly, the fixation strength between the mesh tube and strip portions of the strip-type clips can be improved. Thus, even if a force is intensively applied onto junctions between the mesh tube and the clips during an opening or closing operation of a door, the mesh tube is positively prevented from escaping from the clips, and the wire harness can extend and retract following the opening and closing operation of the door.

In the above embodiment, the mesh tube is used to cover electric wires and/or optical fibers. By using the mesh tube, since plural anchor points are provided between the hot-melt adhesive and the mesh tube, the heat shrinkable tube and the clip are secured fixedly on the mesh tube, even if the mesh tube does not have a characteristic to adhesively bond to the hot-melt adhesive. However, it is possible to use a non-mesh tube, instead of a mesh tube, especially when the non-mesh tube can provide an adhesive bond to the hot-melt adhesive.

In the above-described embodiment, the wire harness is provided, i.e. an electric wire and/or an optical fiber are already inserted into the mesh tube. However, it is possible to provide only a mounting structure that includes only the mesh tube, the clips, and a heat shrinkable tube, and the electric wire and/or and the optical fiber can be inserted later.

Instead of the electric wire and/or the optical fiber, any elongated member can be inserted in the tubular member, i.e. mesh tube. For example, a communication line, e.g. a shield line or a coaxial cable for a network can be inserted.

Furthermore, a clip in the embodiment can have other forms. For example, a connector that connects a wire harness to another wire harness in parallel can be attached to the mesh tube, instead of the clip.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 11-277443, filed on Sep. 29, 1999, which is herein expressly incorporated by reference in its entirety.

What is claimed is:

1. In combination with a tubular member, a mounting structure for said tubular member, comprising:
    an attachment member having a strip portion mounted on an outer peripheral surface of the tubular member; and
    a heat shrinkable tube encircling a part of said strip portion of the attachment member and encircling the tubular member, said heat shrinkable tube being contracted by heating so that the strip portion is fixed to the tubular member.

2. The combination according to claim 1, wherein the tubular member comprises a mesh tube.

3. The combination according to claim 1, further comprising hot-melt adhesive provided on an inner peripheral surface of the heat shrinkable tube.

4. The combination according to claim 1, further comprising at least one elongate member inserted in the tubular member.

5. The combination according to claim 4, wherein the elongate member comprises at least one of an electric wire and an optical fiber.

6. The combination according to claim 1, wherein the tubular member is mounted for movement.

7. The combination according to claim 6, wherein the tubular member is provided between an automobile body and a door attached to the automobile body.

8. The combination according to claim 1, wherein the tubular member is non-extensible and a diameter thereof can be enlarged when the tubular member is axially compressed.

9. The combination according to claim 1, wherein the attachment member is a clip.

10. The combination according to claim 1, wherein the heat shrinkable tube comprises a pair of short tubes, each having a length substantially shorter than a length of the strip portion, the pair of short tubes being provided at opposite ends of the strip portion in a longitudinal direction.

11. The combination according to claim 1, wherein the heat shrinkable tube comprises a hole in a peripheral surface thereof, and an engaging portion projecting from the strip portion projects through the hole toward the exterior of the heat shrinkable tube.

12. A wire harness comprising:
at least one of an electric wire and an optical fiber;
a tubular member into which the at least one of the electric wire and the optical fiber is inserted;
at least one attachment member having a strip portion mounted on an outer peripheral surface of the tubular member; and
a heat shrinkable tube that encircles the strip portion of the attachment member and encircles the tubular member and is contacted by heating so that the strip portion is fixed to the tublar member.

13. The wire harness according to claim 12, wherein the tubular member comprises a mesh tube.

14. The wire harness according to claim 13, wherein the tubular member is non-extensible and a diameter of the tube can be enlarged when the tube is axially compressed to enable insertion of the at least one of an electric wire and an optical fiber.

15. The wire harness according to claim 13, further comprising hot-melt adhesive provided on an inner peripheral surface of the heat shrinkable tube, such that said hot-melt adhesive melts and permeates into a mesh of the mesh tube by heating to provide a plurality of anchor points.

16. The wire harness according to claim 15, further comprising at least two of the attachment members, each comprising a clip, and each having an engaging portion projecting from the strip portion.

17. The wire harness according to claim 16, wherein the wire harness is provided between an automobile body and a back door that is opened and closed in a vertical direction.

18. The wire harness according to claim 12, further comprising hot-melt adhesive provided on an inner peripheral surface of the heat shrinkable tube.

19. The wire harness according to claim 12, wherein the tubular member is mounted for movement.

20. The wire harness according to claim 19, wherein the tubular member is provided between an automobile body and a door attached to the automobile body.

21. The wire harness according to clair 20 wherein a portion of the wire harness is stored in a housing provided on the automobile body when the door is closed and is pulled out from the housing when the door is opened,
at least two of the attachment members,each comprising a clip, and each having an engaging portion projecting from the strip portion, and
wherein one of the attachment members engages with an elastic member provided between the tublar member and the housing so that the tublar member is retracted inside the housing, and the other of the attachment members engages with the door.

22. The wire harness according to claim 12, wherein the attachment member is a clip.

23. The wire harness according to claim 12, wherein the heat shrinkable tube comprises a pair of short tubes, each having a length substantially shorter than a length of the strip portion, the pair of short tubes being provided at opposite ends of the strip portion in a longitudinal direction.

24. The wire harness according to claim 12, wherein the heat shrinkable tube comprises a hole in a peripheral surface thereof, and an engaging portion projecting from the strip portion projects through the hole toward the exterior of the heat shrinkable tube.

25. A method for making a wire harness, comprising:
inserting at least one of an electric wire and an optical fiber into a mesh tube;
mounting a clip on the mesh tube;
encircling the mesh tube and encircling the clip by a heat shrinkable tube; and
heating the heat shrinkable tube to contract the heat shrinkable tube so that the clip is fixed on the mesh tube.

26. The method according to claim 25, further comprising:
providing a hot-melt adhesive on an inner peripheral surface of the heat shrinkable tube; and
heating the hot-melt adhesive to melt and permeate the hot-melt adhesive into the mesh tube to provide a plurality of anchor points.

27. In combination with a tubular member, a mounting structure for said tubular member, comprising:
an attachment member having a strip portion mounted on an outer peripheral surface of the tubular member; and
a heat shrinkable tube surrounding a part of said strip portion of the attachment member and the tubular member, said heat shrinkable tube being contracted by heating so that the strip portion is fixed to the tubular member;
wherein the heat shrinkable tube comprises a hole in a peripheral surface thereof, and an engaging portion projecting from the strip portion projects through the hole toward the exterior of the heat shrinkable tube.

28. A wire harness comprising:
at least one of an electric wire and an optical fiber;
a tubular member into which the at least one of the electric wire and the optical fiber is inserted;
at least one attachment member having a strip portion mounted on an outer peripheral surface of the tubular member; and
a heat shrinkable tube that surrounds the strip portion of the attachment member and the tubular member and is contracted by heating so that the strip portion is fixed to the tubular member;
wherein the heat shrinkable tube comprises a hole in a peripheral surface thereof, and an engaging portion projecting from the strip portion through the hole toward the exterior of the heat shrinkable tube.

* * * * *

UNITED STATES PATENT AND TRADEMARK OFFICE
CERTIFICATE OF CORRECTION

PATENT NO. : 6,417,451 B1  Page 1 of 1
DATED : July 9, 2002
INVENTOR(S) : K. Uchiyama It is certified that error appears in the above-identified patent and that said Letters Patent is hereby corrected as shown below:

Column 9,
Line 25, "contacted" should be -- contracted --
Lines 26 and 62, "tublar" should be -- tubular --.
Line 54, after "20" insert -- , --.
Line 58, "members,each" should be -- members, each --.

Column 10,
Line 1, "tublar" should be -- tubular --.
Line 2, after "inside" insert -- of --.
Line 58, after "portion" insert -- projects --.

Signed and Sealed this

Twenty-second Day of April, 2003

JAMES E. ROGAN
*Director of the United States Patent and Trademark Office*